(12) United States Patent
Petty

(10) Patent No.: US 7,152,636 B2
(45) Date of Patent: Dec. 26, 2006

(54) BRAKE FLUSH ACCELERATOR

(75) Inventor: Jon A. Petty, Loa, UT (US)

(73) Assignee: Phoenix Systems, L.L.C., Bicknell, UT (US)

( * ) Notice: Subject to any disclaimer, the term of this patent is extended or adjusted under 35 U.S.C. 154(b) by 0 days.

(21) Appl. No.: 11/286,925

(22) Filed: Nov. 23, 2005

(65) Prior Publication Data

US 2006/0076079 A1    Apr. 13, 2006

Related U.S. Application Data

(63) Continuation-in-part of application No. 10/981,060, filed on Nov. 4, 2004.

(60) Provisional application No. 60/517,296, filed on Nov. 4, 2003.

(51) Int. Cl.
*B65B 1/04* (2006.01)

(52) U.S. Cl. .......................... 141/65; 184/1.5; 188/352

(58) Field of Classification Search ................. 141/65; 184/1.5; 74/481; 280/88; 188/352
See application file for complete search history.

(56) References Cited

U.S. PATENT DOCUMENTS

| | | | |
|---|---|---|---|
| 5,299,668 A | 4/1994 | Youngers et al. | |
| 6,131,712 A | 10/2000 | Rhodenizer | |
| 6,302,167 B1 * | 10/2001 | Hollub | 141/98 |
| 6,830,083 B1 * | 12/2004 | Hollub et al. | 141/65 |
| 6,845,851 B1 | 1/2005 | Donaldson et al. | |

* cited by examiner

*Primary Examiner*—Steven O. Douglas
(74) *Attorney, Agent, or Firm*—Quarles & Brady Steich Lang, LLP

(57) ABSTRACT

A Brake Flush Accelerator (BFA) selectively depresses a brake pedal while the master cylinder reservoir is under pressure from a brake flush machine, forcing fluid through the system at a very rapid rate. The BFA also provides a thorough flush as internal hydraulic pressure from the master cylinder can be used to exert force to remove contaminates from the brake system. The BFA exposes the low/no pressure area of the master cylinder to fluid flow from the pressurized master cylinder. When the brake pedal is depressed, a port in the master cylinder is opened which exposes the low/no pressure area of the master cylinder to fluid flow from the pressurized master cylinder reservoir. The BFA receives its pneumatic power from an air compressor or is easily adapted to a car tire. The BFA can be powered directly from the brake flush machine or attached to a vehicle's battery.

16 Claims, 3 Drawing Sheets

BRAKE FLUSH ACCELERATOR

RELATED APPLICATIONS

This application is a continuation-in-part of copending U.S. application Ser. No. 10/981,060 entitled "Brake Flush Accelerator" filed Nov. 4, 2004. Additionally, this application claims priority to U.S. provisional Application Ser. No. 60/517,296, filed Nov. 4, 2003, entitled "Brake Flush Accelerator."

BACKGROUND OF THE INVENTION

1. Field of the Invention

The present invention relates in general to automotive systems and, in particular, to a system and method of flushing a brake system.

2. Description of the Related Art

Anti-lock brake system (ABS) design utilizes multiple hydraulic passage ways and valving that restrict fluid movement. As a result, the brake fluid flow through the system is limited and takes excessive time to properly flush the system. The pressure that can be exerted on the system is limited by the master cylinder reservoir adapter. The adapter connects the pressurized fluid from the brake flush machine to the master cylinder reservoir to the brake system. Most reservoirs are a composite or plastic material and cannot be exposed to pressures above 20 pounds-per-square-inch (PSI) without deforming the shape of the reservoir, causing leakage. Most brake flush machines limit master cylinder reservoir pressure to 12–18 PSI to prevent leakage. The low pressure also makes removing brake fluid contamination more difficult.

In addition, brake fluid does not move through each wheel system equally. Instead, the brake fluid takes the path of least resistance. Some brake flush machines flush all the wheels at the same time, while more advanced machines control flow through the wheels. A machine designed to flush all the wheels at the same time will experience an unequal system flush. This means that one part of the brake system may experience minimal fluid flow, which will not provide a proper flush.

Advanced brake flush machines, hereafter referred to as isolated brake flush machines (IBFMs), isolate different parts of the system to control fluid flow. This allows the machine to force fluid though the more restrictive circuits. The downside is that the flush time is lengthened because the flow is isolated to a part of the system and not all the wheels at the same time. A properly isolated flush could take 2–3 times longer to move the same amount of fluid as an all-wheel flush, keeping in mind that the all-wheel flush also experiences an unequal system flush.

Empirical testing using Strip Dip® brake fluid test strips has shown that it takes approximately ½ gallons of brake fluid flushed through the system at sufficient pressure and flow to attain a proper flush to remove contaminants in the system. Most brake flush machines use ½ gallon fluid containers and operate for 10–12 minutes. The last minute or two of the cycle removes whatever fluid is left in the container and dumps the fluid into a waste container so that the service uses ½ gallons of brake fluid each time. This does not mean the ½ gallons of brake fluid was flushed through the system, but only that ½ gallon of brake fluid was consumed by the machine. The actual flush may have used 1 quart of fresh fluid and the other quart was dumped into the waste. The reason this is done is to complete the flush within the allotted time period and consume ½ gallons of brake fluid per service regardless of the quality of flush obtained.

A low/no pressure area in many master cylinder designs is isolated from the normal fluid pathway during a typical flush. This leaves an area of old fluid that can contaminate the new brake fluid after the flush has been performed. Even if ½ gallons of brake fluid is flushed through the system, the isolated low pressure area can contaminate the brake fluid once the brake pedal is depressed a few times. Depressing the brake pedal exposes the new fluid to the low pressure area, which promotes intermixing. This intermixing result has been demonstrated by the use of FASCAR® Strip Dip brake fluid test strips. For example, a candidate vehicle is tested with Strip Dip®, demonstrating a FASCAR® rating of 100, indicating very dirty fluid. The brake flush is performed using ½ gallons of brake fluid and the brake fluid is immediately tested after the service, which results in a FASCAR® rating of 0. The vehicle is then driven in which the brake pedal is depressed several times. Following the test drive of the candidate vehicle, a Strip Dip® retest is performed, which results in a FASCAR® rating of 25. This is not an indication of a problem with the test strip; rather, it shows that the low/no pressure area was not cleaned during the flush process and the old fluid contaminated the rest of the system.

An isolated brake flush machine could take as long as 30 minutes to properly introduce ½ gallons of brake fluid through the system, while current all-wheel flush machines operate for 10–12 minutes and waste the unused fluid. Each brake flush machine has severe design flaws; for example, the time to perform service or the quality of the service performed. The problem with current brake flush machine technology is that it cannot move fluid through the system with enough force to remove contamination. Removal of this contamination is required to perform a proper flush to meet proposed guidelines for brake fluid replacement and system flush.

BRIEF SUMMARY OF THE INVENTION

To attain a proper brake system flush, approximately ½ gallons of brake fluid must be flushed through the system at sufficient pressure and flow to remove contaminates. In addition, the low/no pressure area of the master cylinder must be exposed to fluid flow to flush that portion of the system to prevent future contamination.

A Brake Flush Accelerator Module can be implemented to accompany the new ISM brake flush machines that have begun to enter the automotive service industry. The Brake Flush Accelerator (BFA) described herein solves the problems current brake flush machines exhibit in attaining a proper brake system flush. The BFA operates by selectively depressing the brake pedal while a vehicle is undergoing a brake flush operation by a brake flush machine. The BFA depresses the brake pedal while the vehicle's master brake cylinder reservoir is operating under pressure from the brake flush machine.

The BFA significantly reduces the flush time for any brake flush machine, increases fluid volume and pressure to remove contaminants, and allows the low/no pressure area of the master cylinder to be flushed. The BFA also solves the problems of traditional foot-type bleeding or flushing by accurately controlling the piston stroke and rate of pedal depression and release. The BFA can be designed as a self-contained module or designed to coexist within the control system in an ISM or similar brake flush machine. The BFA receives its pneumatic power from an air compressor or is easily adapted to a car tire. The system can be powered directly by the brake flush machine or easily attached to vehicle battery power through the cigarette lighter.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENTS OF THE INVENTION

The Brake Flush Accelerator Module can be used in conjunction with existing brake flush machines. The invention eliminates the problems with current flush technology and can be used to significantly improve the brake system flush for most types of brake flushing machines.

The Brake Flush Accelerator Module (BFA) automatically depresses the brake pedal while the master cylinder reservoir is under pressure from the brake flush machine. This accomplishes two main functions. First, the BFA can force fluid through the system at a very rapid rate. Testing has shown that the BFA can pump ½ gallons of brake fluid through the brake system as much as five times faster than standard brake flush machines. The BFA also provides a much more thorough flush as internal hydraulic pressure from the master cylinder can be used to exert much more force to remove contaminates from the system.

Second, the BFA exposes the low/no pressure area of the master cylinder to fluid flow from the pressurized master cylinder. When the brake pedal is depressed, a port in the master cylinder is opened which exposes the low/no pressure area of the master cylinder to fluid flow from the pressurized master cylinder reservoir. This flushes the normally isolated portion of the master cylinder and prevents future contamination.

The ideal brake flush machine to be used with the BFA is the IBFM, which can isolate each wheel or a portion of the system to make sure each circuit is properly flushed. The BFA will also work with an all-wheel brake flush machine to enhance its operation, but an equal system flush cannot be attained because there is no way to isolate portions of the brake system.

In addition, the BFA can control the rate at which the brake pedal is released. By releasing the brake pedal slowly, the fluid in the master cylinder can be replenished from the pressurized fluid in the reservoir from the brake flush machine. This prevents the wheels from drawing fluid or air back into the system when the brake pedal is released. If the master cylinder were not under pressure, the master cylinder piston would draw fluid or air back from the open wheel circuits when the brake pedal is released. That is why antiquated brake bleeding required two people, one person to pump the pedal and the other person to open and close the bleeder valve in time with brake pedal depression and release to prevent the system from drawing air. Thus, The BFA solves the problem most commonly associated with foot bleeding or flushing of the hydraulic system.

The BFA control system can be integral with the brake flush machine control system or it can be a stand alone module capable of interfacing with an existing brake flush machine. This makes the unit very marketable to the owner of any brake flush machine as this module can be added to the existing machine to increase its performance.

Figure 1:
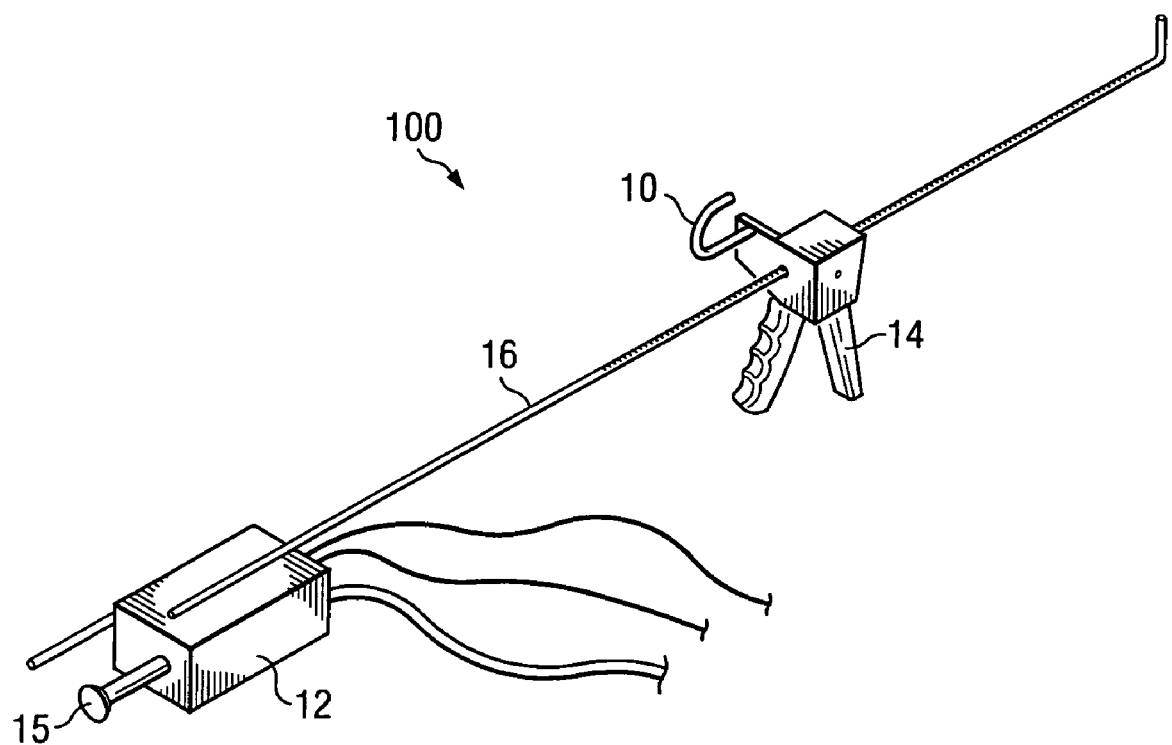
FIG. 1 is a perspective view of the BFA.
Figure 2:
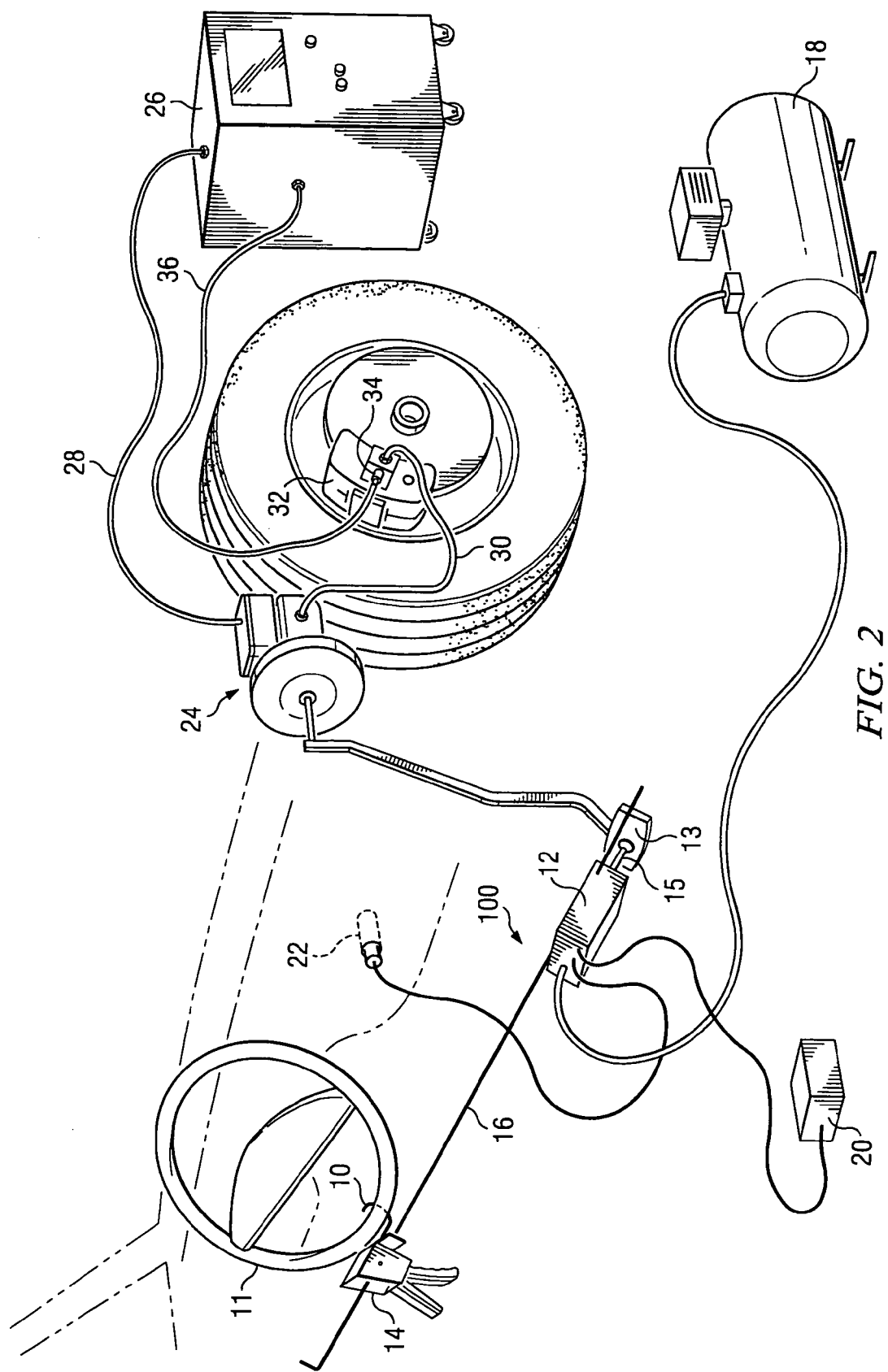
FIG. 2 is a view showing the BFA as part of an overall implementation of a brake flush system in an automobile.

As illustrated in FIGS. 1 and 2, the BFA is uniquely designed so that it can work with any vehicle which has a brake pedal and steering wheel mounted in traditional locations. Turning to FIG. 2, an upper portion 10 of the BFA unit 100 is shown attached to the steering wheel of a vehicle. A lower portion 12 rests securely on the brake pedal. The unit 100 is equipped with a length adjuster 14 to adapt to different brake-to-steering wheel configurations. A guide 16 keeps the module in constant contact with the brake pedal. A user can implement the unit 100 by grasping the handle of the length adjuster 14 to open the length adjuster 14. The upper portion 10 is secured to the steering wheel and the lower portion 12 is extended to rest on the brake pedal. The user can then release the handle to engage the teeth of the length adjuster 14 and securely fix the length of the guide 16. Additionally, a user may user the handle in a racheting motion to adjust the length of the guide 16.

A pneumatic piston is operated by air pressure that is modulated by the BFA control system though an air control solenoid. The BFA also has an air pressure regulator to keep control pressures constant for a variety of supply air conditions. The unit will require a compressed air and a power source. Compressed air is commonly found in the service facility environment. Power for the unit will come directly from the brake flush machine, vehicle battery or vehicle cigarette lighter located in close proximity to the installed BFA. In the event that shop air is not available for a specific application, the system can be adapted to operate pneumatically from tire pressure on the vehicle being serviced.

Turning again to FIG. 2, a BFA unit 100 in the larger overall context of a vehicle undergoing a brake flush operation with the aid of a brake flush machine is depicted. The unit 100 includes the upper portion 10 which is attached to a steering wheel 11. The lower portion 12 securely contacts the brake pedal 13 via a piston 15. Lower portion 12 can include a control assembly having an air pressure regulator, air control solenoid, cylinder, and drive (piston). The length adjuster 14 enables the unit 100 to attach securely between the steering wheel 11 and the pedal 13. Guide 16 is shown coupling the upper portion 10 and lower portion 12 with accompanying hardware. Guide 16 can allow piston 15 to securely contact brake pedal 13 by allowing piston 15 to remain centered over the plane of the brake pedal 13.

Control assembly 12 can receive its power from cigarette lighter adapter 22, or from an external source. The cylinder and pneumatic piston integrated into control assembly 12 can receive air from an external air source 18, such as a compressed air source or even from a vehicle tire. The air-pressure regulator can be integrated into assembly 12 to appropriately control the air supply. The air control solenoid integrated into control assembly 12 couples with the external source 18 and allows air into the piston 15 to extend the piston 15. The air control solenoid can actuate to allow air into the cylinder and extend the piston 15. The brake pedal 13 is then depressed in such an operation. When a user desires the brake pedal to be released, the air control solenoid can then actuate to release the air pressure in the cylinder, allowing the piston 15 to decrease in length.

Electronic control unit (ECU) 20 can include a computer processing device or similar hardware, software, or a combination of hardware and software to send and receive control signals to the control assembly 12. ECU 20 can also be connected via signal bearing mediums such as Ethernet, wireless or otherwise, to an external computer processing device, computer network, or to a brake flush machine 26 (not shown). ECU 20 can be programmed to selectively cause piston 15 to actuate and depress the brake pedal at a predetermined time. ECU 20 can be in electronic communications with brake flush machine 26 or/and via sensors placed on the vehicle to make a determination when the vehicle's master brake cylinder 24 reservoir is undergoing a brake flush operation by the machine and thereby is placing pressure on the reservoir.

FIG. 2 also shows a portion of a vehicle tire and brake system undergoing a brake flush operation with the assistance of an ISBM 26 or related brake flush machine. ISBM 26 is connected to a typical vehicle master cylinder 24 via pressurized line 28. A typical brake flush machine will put the master cylinder 24 reservoir under pressure during a brake flush operation. Pressurized line 20 connects the master cylinder 24 with a typical brake caliper 34. Bleeder valve 34 connects return pressurized line 36 with the ISBM 26. During an example operation of the ISBM 26, pressurized fluid flows through line 28 into the master cylinder 24 brake fluid reservoir. The clean fluid flows through line 30 to brake caliper 32. A user opens bleeder valve 34 to allow the dirty fluid to flow through return line 36 to the brake flush machine. The unit 100 depresses the brake pedal concurrently while the master brake cylinder 24 reservoir is under pressure from a brake flush operation of the ISBM 26.

A first test was performed to determine the effectiveness of the BFA 100. The unit 100 was attached to a ISBM 26. The test vehicle was a 1992 Chevy S-10 pickup with rear wheel ABS. The brake flush procedure took 27 minutes to flush ½ gallons of new brake fluid through the brake system. The ISBM 26 is capable of isolating the wheel circuits which takes additional time to flush the system, as previously described.

A second test was performed to determine the effectiveness of the flush using the Brake Flush Accelerator. The test was performed using an all-wheel brake flush machine and FASCAR® Strip Dip brake fluid test strips. A control brake fluid with a known FASCAR rating of 100 was placed into the vehicle brake system. The vehicle was tested with Strip Dip®, demonstrating a FASCAR® rating of 100. The typical 12 minute brake flush was performed using ½ gallon of new brake fluid (FASCAR®=0) and the brake fluid was immediately tested in the master cylinder after the service, which resulted in a FASCAR® rating of 0. The vehicle was then driven and the brake pedal was depressed several times and a Strip Dip® retest was performed, which resulted in a FASCAR® rating of approximately 50. As might be expected, the all-wheel flush machine did not do a very good job in removing contamination from the brake system. This can be quite a problem if the customer brings his vehicle within a couple of weeks and a routine brake fluid test is performed and the technician recommends another brake flush.

Another sample of control brake fluid with a FASCAR® rating of 100 was placed back into the same vehicle. The vehicle was driven and the brake pedal depressed several times to make sure the control fluid was distributed throughout the system. A second flush was performed using an ISBM 26 and the BFA 100. The flush took approximately 7 minutes to flush a full ½ gallons of brake fluid through the system, almost twice as fast as the all-wheel machine, which also pumped the unused fluid directly into waste. The ISBM and the BFA used a full ½ gallons of new brake fluid. The 7 minute flush also saved about 20 minutes over the standard isolated brake system flush. The brake fluid was immediately tested in the master cylinder after the service, which resulted in a FASCAR® rating of 0. The vehicle was then driven and the brake pedal was depressed several times and a Strip Dip® retest was performed, which resulted in a FASCAR® rating of approximately 10. The exact rating was difficult to ascertain because only a very light pink was noticed on the FASCAR® test, which was well below the 25 FASCAR® rating on the color chart. While it is not possible to flush 100% of the contamination from the brake system, a FASCAR® rating reduction from 100 to 10 is approximately a 95% reduction in contaminants because the FASCAR® rating scale is not linear.

The efficiency of the brake flush with the addition of the Brake Flush accelerator is attributed to the flushing of the low/no pressure area of the master cylinder and to sufficient fluid volume and pressure to remove contaminants from the system. The ability to isolate the circuits in the brake system ensures more equalized fluid flow and a more complete brake system flush.

Figure 3:
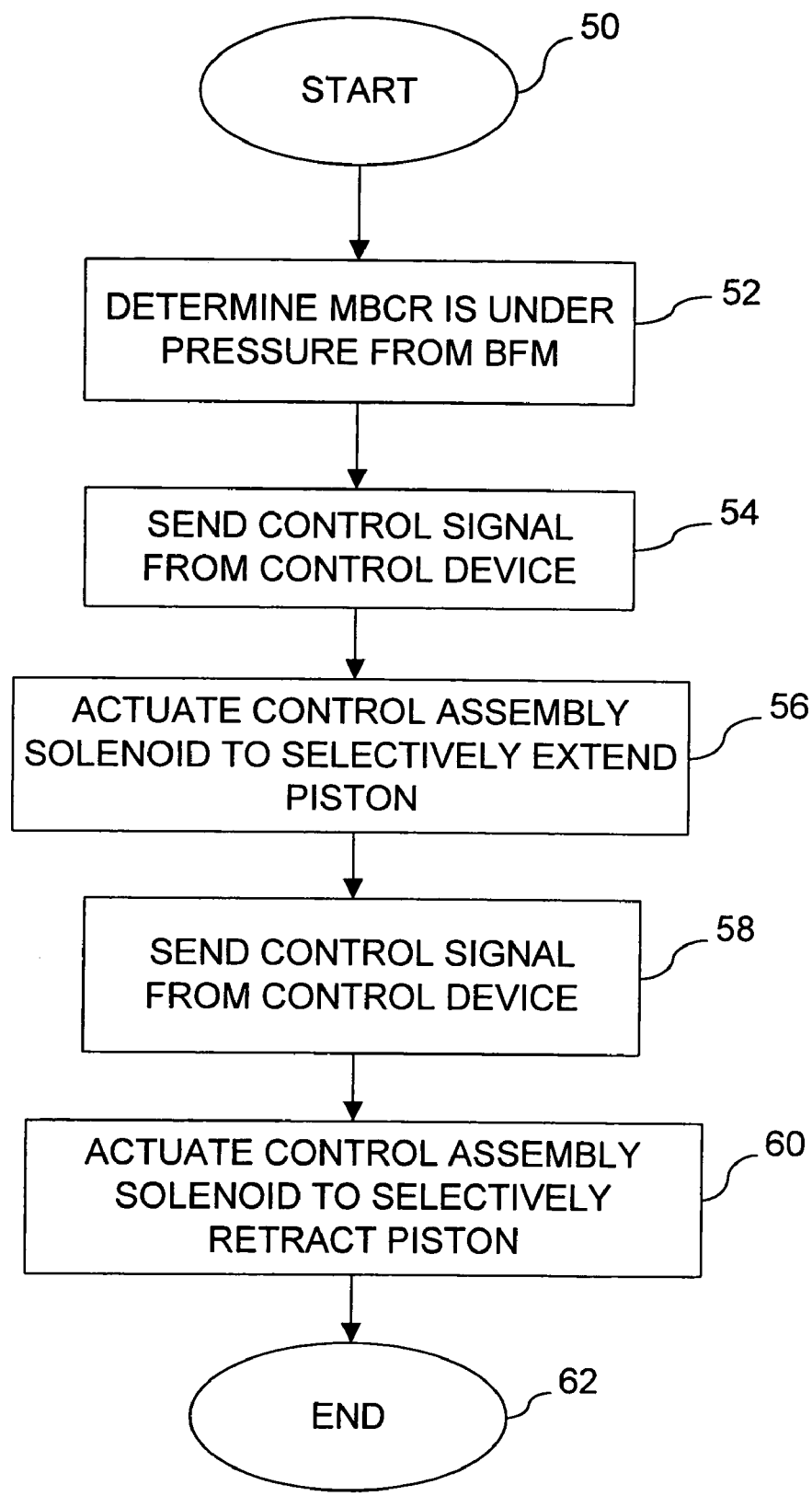
FIG. 3 is a flow chart diagram describing the functions of the BFA.

Turning to FIG. 3, a flow chart diagram of an example method of operation of a BFA is depicted. The method begins with step 50. The BFA then determines, using the respective computer processing device associated with the ECU, whether the device detects a communication signal from an attached isolated brake flush machine or otherwise, whether the master brake cylinder reservoir is under appropriate pressure from a brake flush operation in step 52. In step 54, a control signal is sent to the air control solenoid from the ECU or similar computer processing or control device. As previously described, the BFA can work in tandem with a brake flush machine's control systems. A computer processing device located as part of the brake flush machine can send a control signal to the ECU located as part of the BFA when sensors or similar hardware indicate that sufficient pressure has been applied to the brake master cylinder and the associated reservoir.

In response from the control signal, the air control solenoid actuates to let compressed air into the cylinder and extend the piston and, thereby, depress the brake pedal in step 56. At the appropriate time interval, the ECU then sends a control signal to the air control solenoid in step 58. The control signal instructs the air control solenoid to actuate to selectively retract the piston in step 60. The function of selectively retracting the piston can be programmed into the ECU or similar hardware to cause the brake pedal to be gradually released as previously described, improving the overall performance of the brake flush operation. Step 62 ends the method.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A brake flush accelerator device for a vehicle coupled to a brake flush machine (BFM), the BFM in fluid communication with a master brake cylinder reservoir (MBCR) of the vehicle, comprising:
   an assembly for depressing a brake pedal; and
   a computer processing device electrically coupled to the assembly, wherein the computer processing device is operable to determine whether the MBCR is under pressure from an operation of the BFM and concurrently send a control signal to the assembly to selectively depress the brake pedal.

2. The device of claim 1, wherein the assembly further includes an upper portion having a length adjuster and operable to couple to a steering wheel.

3. The device of claim 1, wherein the assembly further includes a pneumatic piston with an associated air control solenoid for depressing the brake pedal.

4. The device of claim 3, wherein the pneumatic piston is adapted to rest on a brake pedal.

5. The device of claim 1, wherein the computer processing device is electrically coupled to the BFM.

6. The device of claim 3, wherein the assembly further includes a guide adapted to keep the pneumatic piston in contact with the brake pedal.

7. An accelerator module for a vehicle having a master brake cylinder reservoir (MBCR) and coupled to a brake flush machine (BFM), comprising:
   an assembly for depressing a brake pedal; and
   a control device, electrically coupled to the assembly, wherein the control device sends a control signal to the assembly to selectively depress the brake pedal in response to the MBCR and concurrently while the MBCR is under pressure from the BFM.

8. The module of claim 7, wherein the assembly further includes an upper portion having a length adjuster and operable to couple to a steering wheel.

9. The module of claim 7, wherein the assembly further includes a pneumatic piston connected to an air source for depressing the brake pedal.

10. The module of claim 9, wherein the pneumatic piston is adapted to rest on a brake pedal.

11. The module of claim 7, wherein the control device is electrically coupled to an isolated brake flush machine (ISBM).

12. The module of claim 9, wherein the assembly further includes a guide adapted to keep the pneumatic piston in contact with the brake pedal.

13. A method of accelerating a brake flush of a vehicle coupled to a brake flush machine (BFM), comprising:
   determining that a master brake cylinder reservoir of the vehicle is under pressure from the brake flush machine; and
   sending a control signal in response to the determining step to direct an assembly to selectively depress a brake pedal of the vehicle.

14. The method of claim 13, further including sending a control signal to direct an assembly to selectively release the brake pedal.

15. The method of claim 13, wherein the control signal is sent from the BFM.

16. The method of claim 13, wherein the control signal is sent from a computer processing device electrically coupled to the BFM.

* * * * *